June 5, 1934.  F. G. CASKEY  1,961,871
RADIO PROGRAM CONTROLLER
Filed Aug. 18, 1932   2 Sheets-Sheet 1
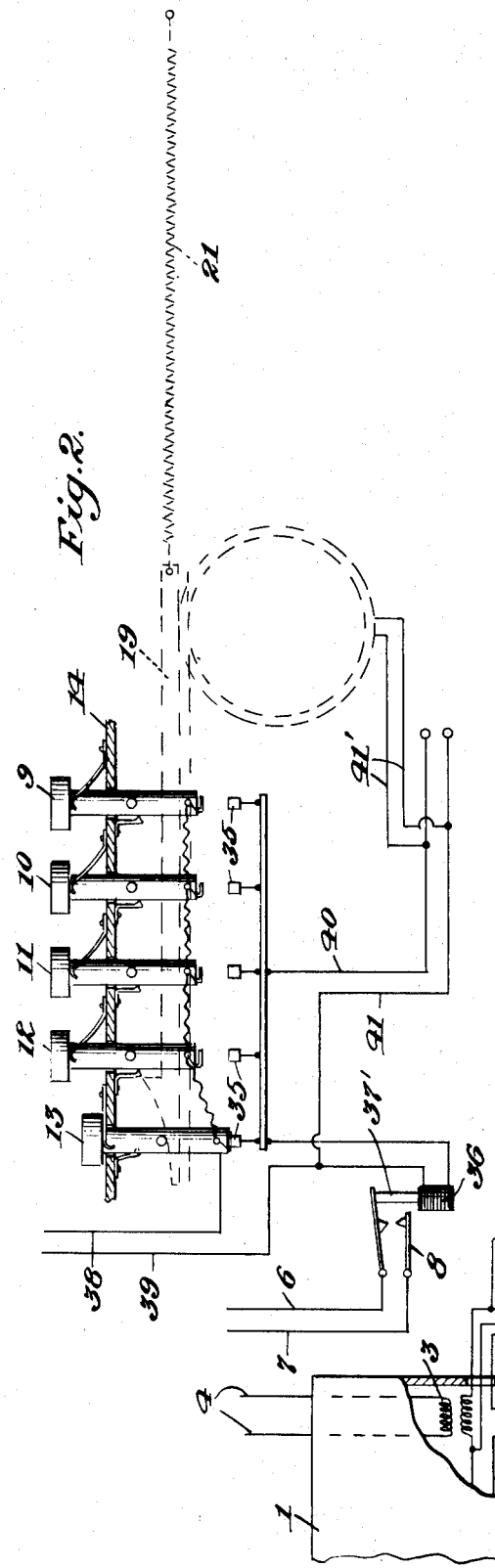
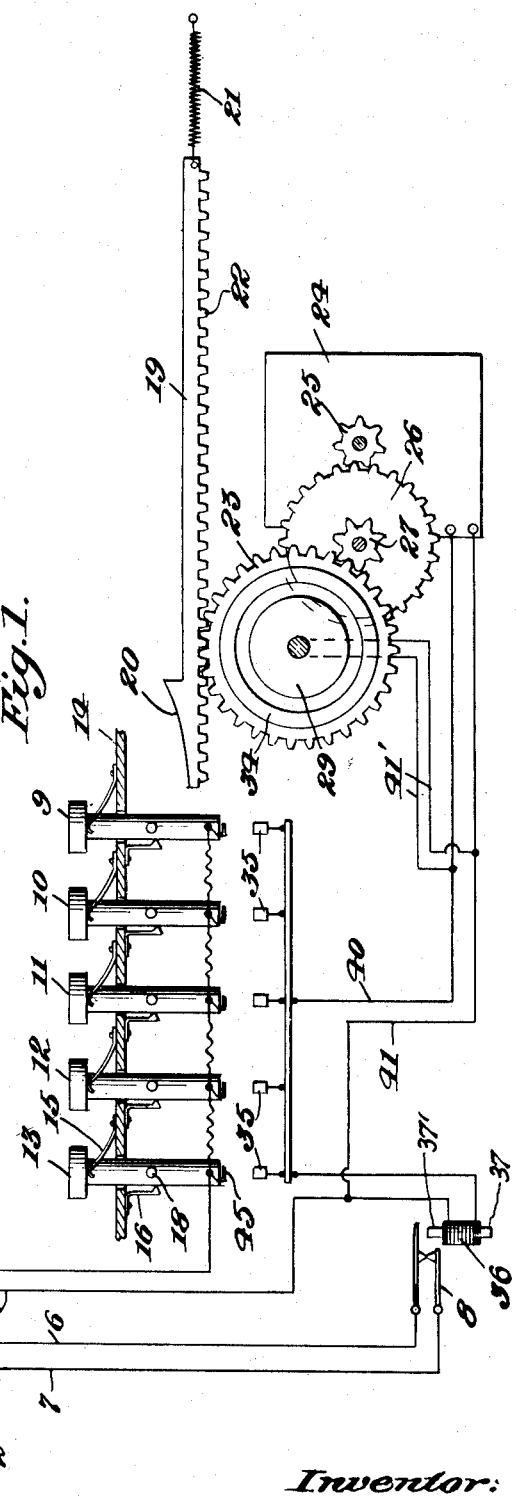
Inventor:
Floyd G. Caskey,
by James Askins
Att'y.

June 5, 1934.  F. G. CASKEY  1,961,871
RADIO PROGRAM CONTROLLER
Filed Aug. 18, 1932   2 Sheets-Sheet 2

Inventor:
Floyd G. Caskey,
by James Atkins
Att'y.

Patented June 5, 1934

1,961,871

UNITED STATES PATENT OFFICE 1,961,871

RADIO PROGRAM CONTROLLER

Floyd G. Caskey, Washington, D. C.

Application August 18, 1932, Serial No. 629,364

5 Claims. (Cl. 161—1)

My invention relates to radio program controllers, and more particularly to an apparatus arranged to switch off a radio receiver during predetermined intervals.

At the present time, if it is desired to eliminate reception of a part only or the entire duration of a program on the air, it is necessary for the operator of the receiver to manually operate the main switch of his receiver to open its energizing circuit. It is frequently the desire of the operator to eliminate, for example, a certain song audition, particular type of music, or a speech. The operator is aware, usually in advance of the duration of this portion of the program which may consume, for example, say 5 minutes or even 30 minutes. If a present-day type of receiver is in use, it becomes necessary to again approach the receiver at the end of the time interval selected and manually switch on the receiver.

According to my invention and apparatus, which may be adapted to any existing receiver, a means is provided whereby a receiver may be manually switched off and automatically switched on again after any predetermined desired time interval.

The main object of my invention, therefore, is to provide a radio program controller that is adapted to permit a manual switch-off of a receiver at any desired instant, in combination with means for automatically switching on of the receiver at the end of any predetermined time interval after the receiver is switched off.

Another object is to provide a means that will permit a radio receiver to be manually switched off and manually switched on at the end of any interval or prior to any automatic switching on of the receiver.

Another object is to provide a program controller that derives energization for its operation from the house current supply which is employed to operate the receiver.

Another object is to provide a program controller that is simple to operate and install, as well as economical to manufacture and maintain.

Other objects will become apparent from the specification which follows when considered with the accompanying drawings wherein—

Fig. 1 is a schematic assembled plan view of my controller as applied to a receiver showing relative position of parts permitting normal reception by the receiver.

Fig. 2 shows the position of parts permitting elimination of a part of the program and just prior to restoration of parts to permit a normal reception.

Figure 3:
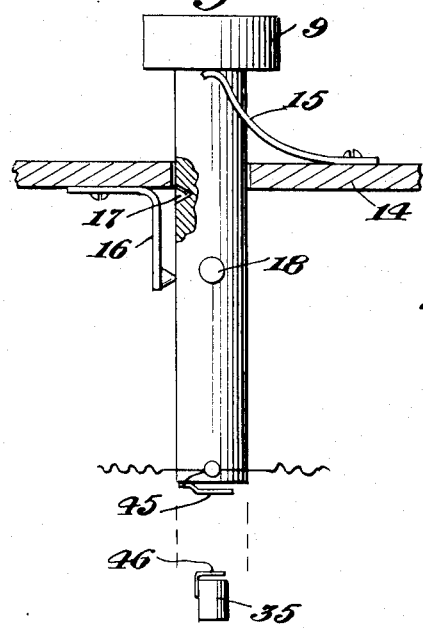
Fig. 3 is an enlarged view of one of the time set keys.

Referring to the drawings in detail, a radio receiver 1 is shown as provided with the usual main switch 2, transformer 3, and 110-volt supply 4. The switch 2 is arranged to control energization to the circuit 5 which supplies the receiver units. These parts are shown conventionally and form no part of my invention except that I propose to break the secondary circuit and tap out two lead wires 6—7 which lead to an auxiliary switch 8.

A series of time control keys 9, 10, 11, 12, 13, are mounted on a support or casing 14 which may comprise the casing which contains the entire control. Each key is urged upwardly by a spring 15 and when pressed down is releasably held in lower position by means of a spring dog or the like 16, shown best in Fig. 3, which dog may engage a recess 17 on the key when in the lower position thereof. Each key is provided with a laterally extending pin or lug 18 for a purpose to be described. Each key cooperates with a stationary contact 35.

Briefly, the function of each key when pressed down is to switch off the receiver and energize an electric motor and combined magnetic clutch, which motor, after a predetermined time interval, operates a cam to restore the key to its original position and switch on the receiver.

Figure 5:
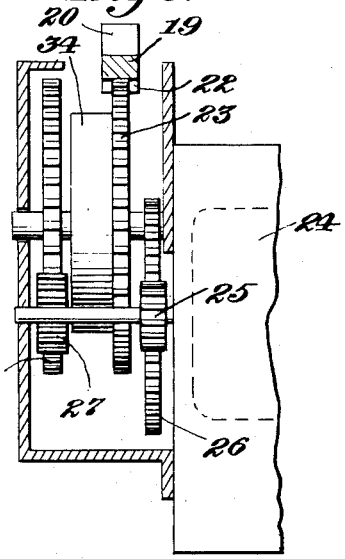
Fig. 5 is a view of an electric drive motor and associated gearing.

In line with the pins 18, I mount a cam and rack 19 which carries a cam 20 at the forward end. A spring 21 is arranged to return the rack 19 after each operation thereof. The teeth 22 of the rack engage a gear 23, as shown best in Fig. 5.

Figure 4:
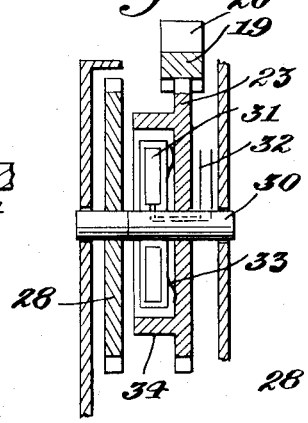
Fig. 4 is an enlarged view of a magnetic clutch.

An A. C. motor 24 of the synchronous clock type is arranged to drive a train of gears 25, 26, 27, 28, of which train, gear 28 is the slow speed gear. In order to drive the rack 19 and gear 23 in a manner to permit return of the rack after each operation, I provide a magnetic clutch 29 which functions to slide the gear 23 to the left in Fig. 5 when the clutch is energized, and this action is had as soon as any key is pressed. The gear 23 is loose on a shaft 30 and this shaft supports the coil 31 of the clutch. The supply wires 32 for the coil pass through the shaft 30 through a bore or a slot, A spring 33 acts to return gear 23 to the right in Figs. 4 and 5 after each operation of a key and each forward movement of the rack. Movement of gear 23 to the left causes friction lug 34 to engage the gear 28 to drive gear 23.

Each key co-operates with a stationary contact 35. In Figs. 1 and 2 a solenoid 36 is shown for operating a movable core 37 which engages the switch 8 to open same. The upper end of the core 37 is provided with a non-magnetic extension 37' which is adapted to engage the switch 8. The solenoid circuit is tapped off by conductors 38—39 and this circuit is closed when a key 9 engages its contact 35. When this circuit is energized, the clutch and motor circuits become energized and the latter circuits are in parallel. Conductors 40—41 lead respectively from the contacts 35 and conductor 39, and are connected to the motor 24. The conductors 41' are tapped off from the conductors 40—41 and are connected to the clutch coil 31.

Figure 6:
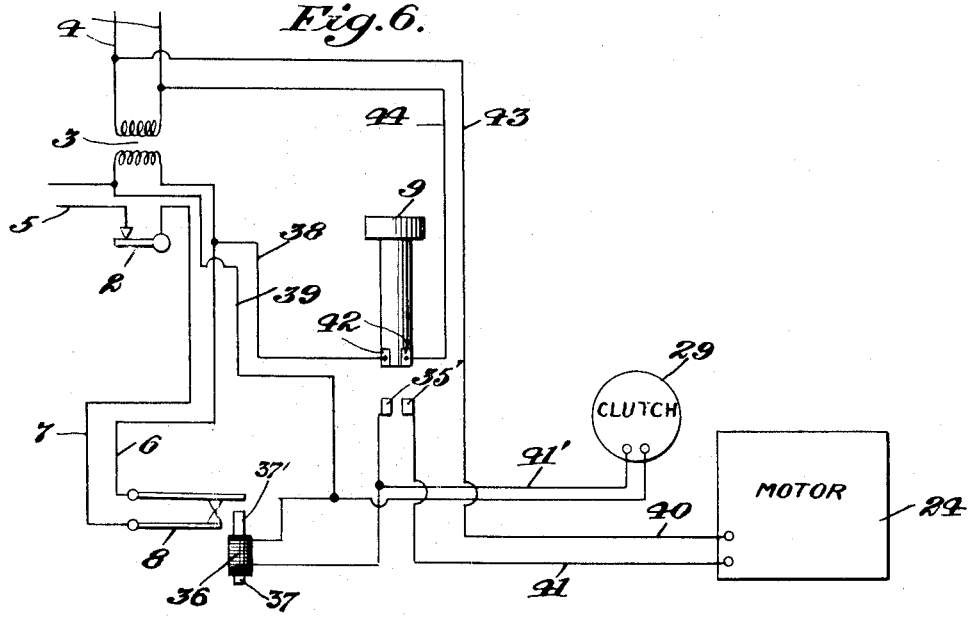
Fig. 6 shows a modification.

In the modification of Fig. 6, circuits are shown in a manner to permit use of 110 volts on the motor 24 and a low voltage of say 10 volts on the solenoid 36 and clutch coil 31. To secure this operation, I merely provide two pairs of contacts 35' and 42 so that a key such as 9 will close two circuits, one 110 volt circuit between the line wires 4 and the motor through 110 volt leads 43—44 and a second low voltage circuit, through the solenoid and clutch coil in parallel. If desired, I may arrange spring contacts 45—46 on the keys 9—13 and contacts 35.

In the operation of my device, if it is desired to switch off a radio program for say 25 minutes, key number 13 is pressed down which closes simultaneously three circuits through the solenoid 36, clutch coil 31 and motor 24. The core 37 functions at once to open switch 8 and switch off the receiver. The clutch 29 operates to engage gears 23 and 28 to drive the gear 23 and rack 19 from motor 24 which is now in operation. This causes the rack 19 to move to the left in Fig. 1. The cam 20 is so positioned and the gearing so designed that it will require exactly 25 minutes for the cam 20 to move under the pin 18 on key 13. This position of the cam is shown in Fig. 2, wherein the cam is urging the key 13 upwardly to disengage the dog 16 from recess 17 whereafter the spring 15 will cause the key to snap upwardly to break all energizing circuits between the key 13 and contact 35. The spring contacts 45—46 permit these circuits to open quickly at the instant the key snaps up. The switch 8 will then close to switch on the receiver and the clutch coil 31 is de-energized whereby gear 23 is freed from gear 28. When gear 23 becomes free, the spring 21 will return rack 19 to the right for a next operation.

A similar operation will occur when any key is pressed down. The keys will be numbered on their upper faces in minutes, e. g. 5, 10, 15, 20, 25. If the 5 minute key numbered 9 is pressed, the cam 20 will be caused to move to the left for only 5 minutes or until it strikes pin 18 on key 9 to raise this key and open all circuits. If, at any time, before automatic return of a pressed key, it is desired to switch on the receiver, the operator need only pull upwardly on the pressed key to cause same to snap to its upper position and open all circuits as in the case of automatic operation.

While I have shown and described a prefered form of my invention, it is to be understood that various modifications and mechanical equivalents thereof are contemplated such as may be embraced within the scope of the appended claims.

I claim:

1. In a program controller for a radio receiver, an alternating current circuit for energizing said receiver, a movable timing element, a synchronous motor, means responsive to movement of said element for opening said circuit to cut out said receiver, means responsive to said movement of said element for starting said motor, and means responsive to movement of said motor for restoring said element a predetermined time after its movement to render said receiver operative.

2. In a radio receiver, in combination, an energizing circuit for said receiver, a series of manually movable timing elements, an electric motor, means responsive to movement of any one of said elements for opening said circuit to cut out said receiver, means responsive to movement of said element for starting said motor, means responsive to movement of said motor for restoring said element to its original position a predetermined time after its movement to again render said receiver operative, the elapsed time required to render said receiver operative being variable according to which element of the series is operated.

3. In a program controller for radio receivers, a manually controlled device, means responsive to operation of said device for cutting said receiver out of operation, a source of current supply for said receiver, a timing element, means responsive to operation of said device for moving said timing element, means responsive to movement of said timing element for restoring said device to its original position a predetermined time after operation of said device, and means for automatically restoring the timing element to its original position after movement of the device to its original position.

4. In a program controller for radio receivers, an energizing circuit for said receiver, a switch in said circuit, a series of manually movable elements selectively operable, and means operably responsive to movement of a selected element to open said switch to cut out said receiver, a timing element, means to move said timing element at a constant speed, means responsive to movement of any movable element for initiating movement of said timing element, the extent of movement of said timing element being variable according to the movable element operated, and means operably responsive to movement of said timing element for closing said switch a predetermined time after operation of said manually movable element.

5. In a program controller for radio receivers, an energizing circuit for said receiver, a manually controlled device, means responsive to movement of the device for opening said circuit, automatic means operably responsive to movement of said device for closing said circuit after elapse of a predetermined time interval, and a detent for holding said device in the position to which it is moved, whereby said manually controlled device is capable of being manually restored to its circuit-closing position by pressure thereon prior to any automatic closure of the circuit.

FLOYD G. CASKEY.

Patent No. 1,961,871                          Granted June 5, 1934

FLOYD G. CASKEY

The above entitled patent was extended August 7, 1951, under the provisions of the act of June 30, 1950, for 7 years and 131 days from the expiration of the original term thereof.

*Commissioner of Patents.*